(12) United States Patent
Amrutiya et al.

(10) Patent No.: US 12,393,945 B2
(45) Date of Patent: Aug. 19, 2025

(54) METHOD AND SYSTEM FOR PAYMENT PROCESSING USING DISTRIBUTED DIGITIZED SURROGATES

(71) Applicant: Mastercard International Incorporated, Purchase, NY (US)

(72) Inventors: Vimal Ganeshbhai Amrutiya, Jamnagar (IN); Nirmish Dholakia, Rajkot (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 140 days.

(21) Appl. No.: 17/876,140

(22) Filed: Jul. 28, 2022

(65) Prior Publication Data
US 2024/0037556 A1 Feb. 1, 2024

(51) Int. Cl.
*G06Q 20/40* (2012.01)
*G06Q 20/38* (2012.01)

(52) U.S. Cl.
CPC ..... *G06Q 20/4014* (2013.01); *G06Q 20/3821* (2013.01); *G06Q 20/3825* (2013.01); *G06Q 20/3829* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 10,963,881 B2 * | 3/2021 | Davis | ............... | G06Q 20/382 |
| 11,379,835 B2 * | 7/2022 | Nanduri | ........... | G06Q 20/027 |
| 2017/0262832 A1 * | 9/2017 | Deshpande | ........... | G06Q 20/20 |
| 2018/0197173 A1 | 7/2018 | Durvasula et al. | | |
| 2019/0180275 A1 * | 6/2019 | Safak | ................ | G06Q 20/382 |
| 2019/0303920 A1 | 10/2019 | Balaraman et al. | | |
| 2020/0193425 A1 | 6/2020 | Ferenczi et al. | | |
| 2021/0065174 A1 * | 3/2021 | Singh | ............... | G06Q 20/3676 |
| 2021/0406871 A1 | 12/2021 | Ravinathan et al. | | |
| 2022/0067712 A1 | 3/2022 | Sarin | | |
| 2022/0114585 A1 * | 4/2022 | Gaddam | ......... | G06Q 20/40145 |
| 2023/0419308 A1 * | 12/2023 | Madisetti | ........... | G06Q 20/38 |

OTHER PUBLICATIONS

International Search Report and Written Opinion of the International Searching Authority issued by the Korean Intellectual Propery Office on Nov. 1, 2023, in corresponding application No. PCT/US2023/026847 (8 Pages).

* cited by examiner

*Primary Examiner* — Chrystina E Zelaskiewicz
(74) *Attorney, Agent, or Firm* — Panitch Schwarze Belisario & Nadel LLP

(57) ABSTRACT

A method for pre-authorization of a payment transaction with tokenized credentials includes: receiving a first data set signed with a first digital signature and including an acquirer identification value and a second data set; verifying the first digital signature using a first public key of a first cryptographic key pair associated with the acquirer identification value; extracting, from the first data set in response to verification of the first digital signature, the second data set including a merchant identification value and a third data set; extracting, from the second data set, the third data set including an issuer identification value and transaction data; identifying an issuing computing system based on the issuer identification value; and transmitting a fourth data set to the issuing computing system, the fourth data set including the first data set and a steward identification value.

16 Claims, 5 Drawing Sheets

METHOD AND SYSTEM FOR PAYMENT PROCESSING USING DISTRIBUTED DIGITIZED SURROGATES

FIELD

The present disclosure relates to payment processing using distributed digitized surrogates, specifically the pre-authorization of payment transactions that use tokenized credentials.

BACKGROUND

In modern times, consumers are regularly digitizing their payment cards for both security and convenience. Digitization typically involves the creation of a digital token that is used in place of the standard payment credentials for a payment account, where the consumer presents the digital token in place of a traditional payment card when conducting a payment transaction. The payment token is added to a transaction message that is transmitted across payment rails, which is swapped for the standard payment credentials by a token service provider as part of the payment processing. Often, the token service provider is the payment network on whose rails the transaction is being processed, or could be a third party provider in association therewith.

Payment tokens are often stored in mobile devices, such as smart phones or smart watches, to provide convenience for consumers. Many consumers are interested in the added security a payment token can provide, as the true payment credentials are not stored on the consumer's device, which can provide for added security if the device gets stolen or a transmission therefrom gets intercepted. However, in current systems, payment tokens are distributed by token service providers, which have to participate in the payment transaction and perform the detokenization, providing an opportunity for the real payment credentials to be stolen or intercepted. As a result, there is a need for an improvement to payment processing systems to provide for complete and total privacy of actual payment credentials when using digitized payment instruments.

SUMMARY

The present disclosure provides a description of systems and methods for pre-authorization of a payment transaction with tokenized credentials. The system includes several entities, each of which have their own unique identifier to provide for verification by all other entities in the system. A consumer, using their computing device, submits their credentials and a payment token, issued to them directly by the issuer of the associated payment account, to a merchant in a first data set. The merchant appends their credentials to the first data set to create a second data set, which is forwarded on to the merchant's acquirer. The acquirer appends their credentials to the second data set to create a third data set, which is forwarded on to a steward, such as a payment processor. The steward appends their credentials to the third data set to create a fourth data set, which is forwarded to the issuer. The issuer identifies the transaction account that corresponds to the token and performs standard processing to authorize the transaction. The issuer appends their own credentials to a fifth data set that includes the fourth data set and the authorization of the transaction, which is sent back to the steward. The steward generates a sixth data set that includes the fifth data set and any completing information, such as status, the steward's credentials, etc. The sixth data set is written to a distributed ledger, such as a blockchain, along with the other data sets generated throughout the process. The result is a transaction that can be fully verified along each step of the way, where each involved entity can be separately verified by every other entity, and where the authentic payment credentials are never available to any entity aside from the issuer of the transaction account, providing for significantly greater security for consumers without sacrificing convenience. In some cases, the credentials for every entity can also be stored on a distributed ledger, such as a blockchain, to provide for even greater security with respect to verifications of entities involved in the transaction. The result is an overall more secure and trustworthy system than traditionally available.

A method for pre-authorization of a payment transaction with tokenized credentials includes: receiving, by a receiver of a processing server, a first data set, wherein the first data set is signed with a first digital signature and includes at least an acquirer identification value and a second data set; verifying, by a verification module of the processing server, the first digital signature using a first public key of a first cryptographic key pair associated with the acquirer identification value; extracting, from the first data set in response to verification of the first digital signature, the second data set, wherein the second data set includes at least a merchant identification value and a third data set; extracting, from the second data set, the third data set, wherein the third data set includes at least an issuer identification value and transaction data; identifying, by a processor of the processing server, an issuing computing system based on at least the issuer identification value; and transmitting, by a transmitter of the processing server, a fourth data set to the issuing computing system, wherein the fourth data set includes at least the first data set and a steward identification value.

A system for pre-authorization of a payment transaction with tokenized credentials includes: an issuing computing system; and a processing server, the processing server including a receiver receiving a first data set, wherein the first data set is signed with a first digital signature and includes at least an acquirer identification value and a second data set, a verification module verifying the first digital signature using a first public key of a first cryptographic key pair associated with the acquirer identification value, a processor extracting, from the first data set in response to verification of the first digital signature, the second data set, wherein the second data set includes at least a merchant identification value and a third data set, extracting, from the second data set, the third data set, wherein the third data set includes at least an issuer identification value and transaction data, and identifying an issuing computing system based on at least the issuer identification value, and a transmitter transmitting a fourth data set to the issuing computing system, wherein the fourth data set includes at least the first data set and a steward identification value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

a payment token for the selected transaction account. The payment token can be a digital value that is representative of a transaction account and unique associated therewith. In an exemplary embodiment, the payment token can be generated such that the transaction account cannot be identified using the payment token without prior knowledge of the transaction account.

In one embodiment, the payment token, also referred to herein as a payment credential, can be of the following format:

```
{
  "token": {
    "urn":"f603e19a-3232-11ec-8d3d-0242ac130003:c9eb1c08-322e-11ec-8d3d-0242ac130003",
    "exp":"122022"
  }
  "signature": "b58dd5603432aa0de72e2bf5d5c24b05761eb80b6de8eaf91e355567cf6aa7dc"
}
```

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Payment Processing Using Distributed Digitized Surrogates

Figure 1:
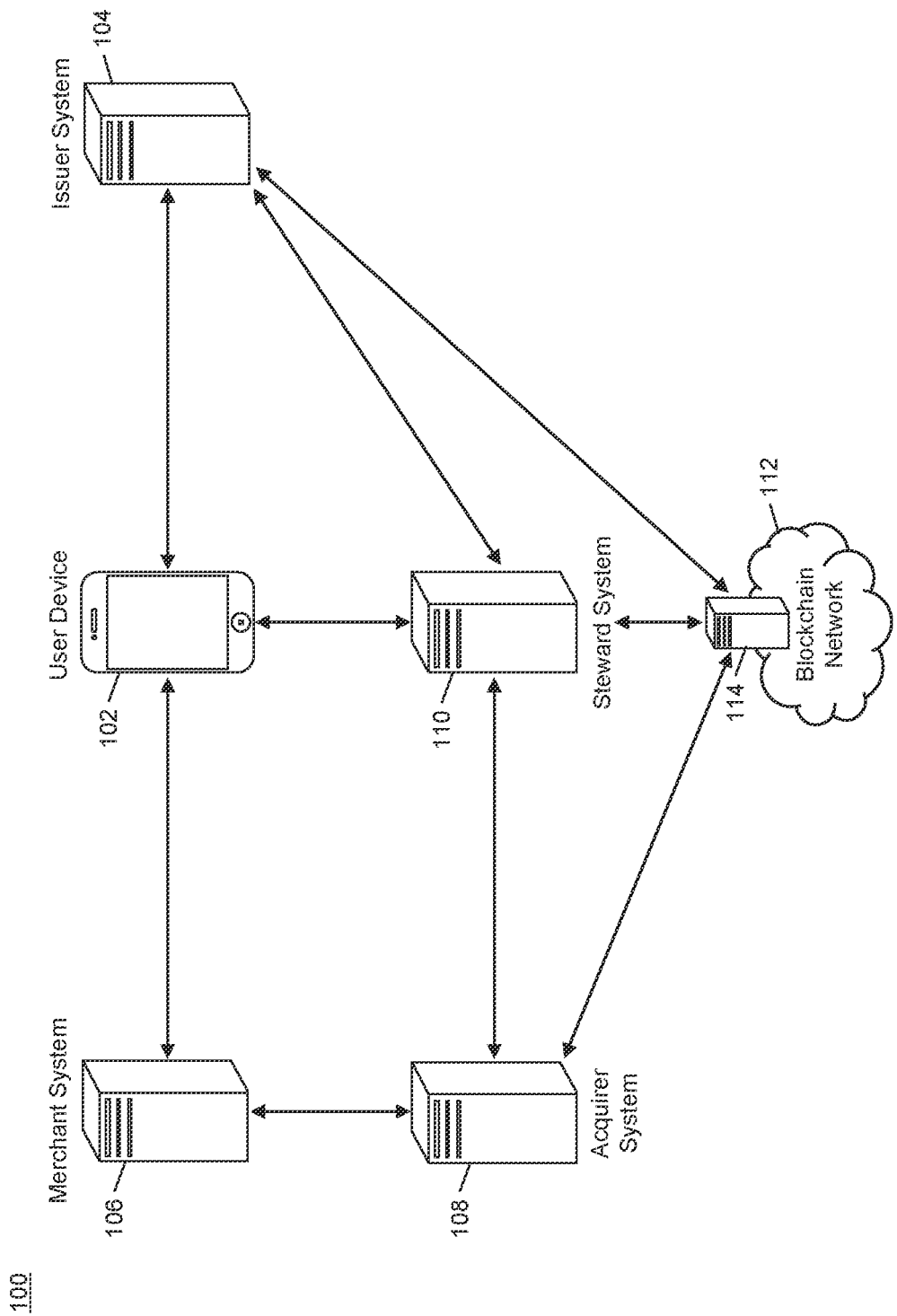
FIG. 1 is a block diagram illustrating a high level system architecture for payment processing using distributed digitized surrogates in accordance with exemplary embodiments.

FIG. 1 illustrates a system 100 for the processing of payment transactions that utilized distributed digitized surrogates, such as payment tokens, where transaction data and identity data can be stored in a distributed ledger, such as a blockchain.

Figure 2:
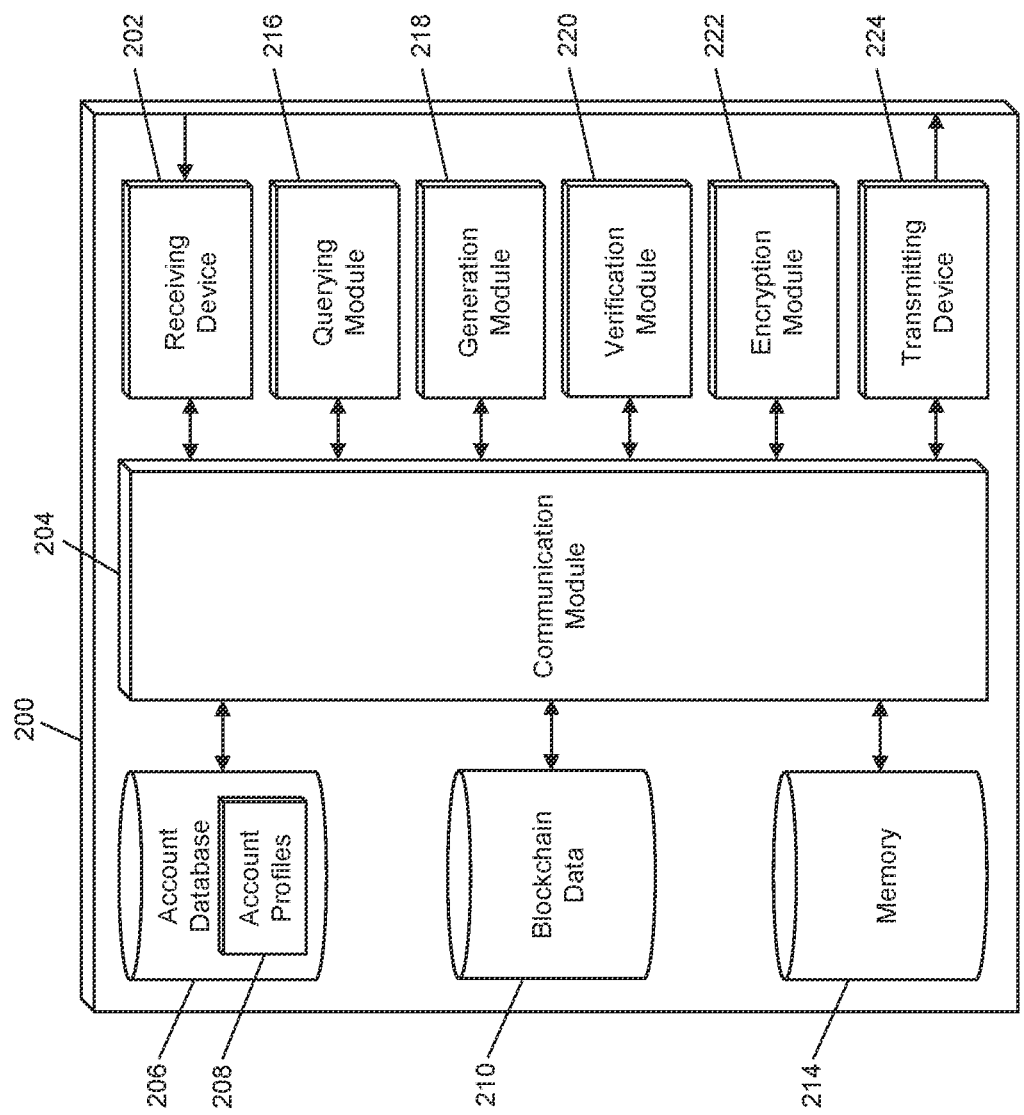
FIG. 2 is a block diagram illustrating a computing system in the system of FIG. 1 for payment processing using distributed digitized surrogates in accordance with exemplary embodiments.
Figure 5:
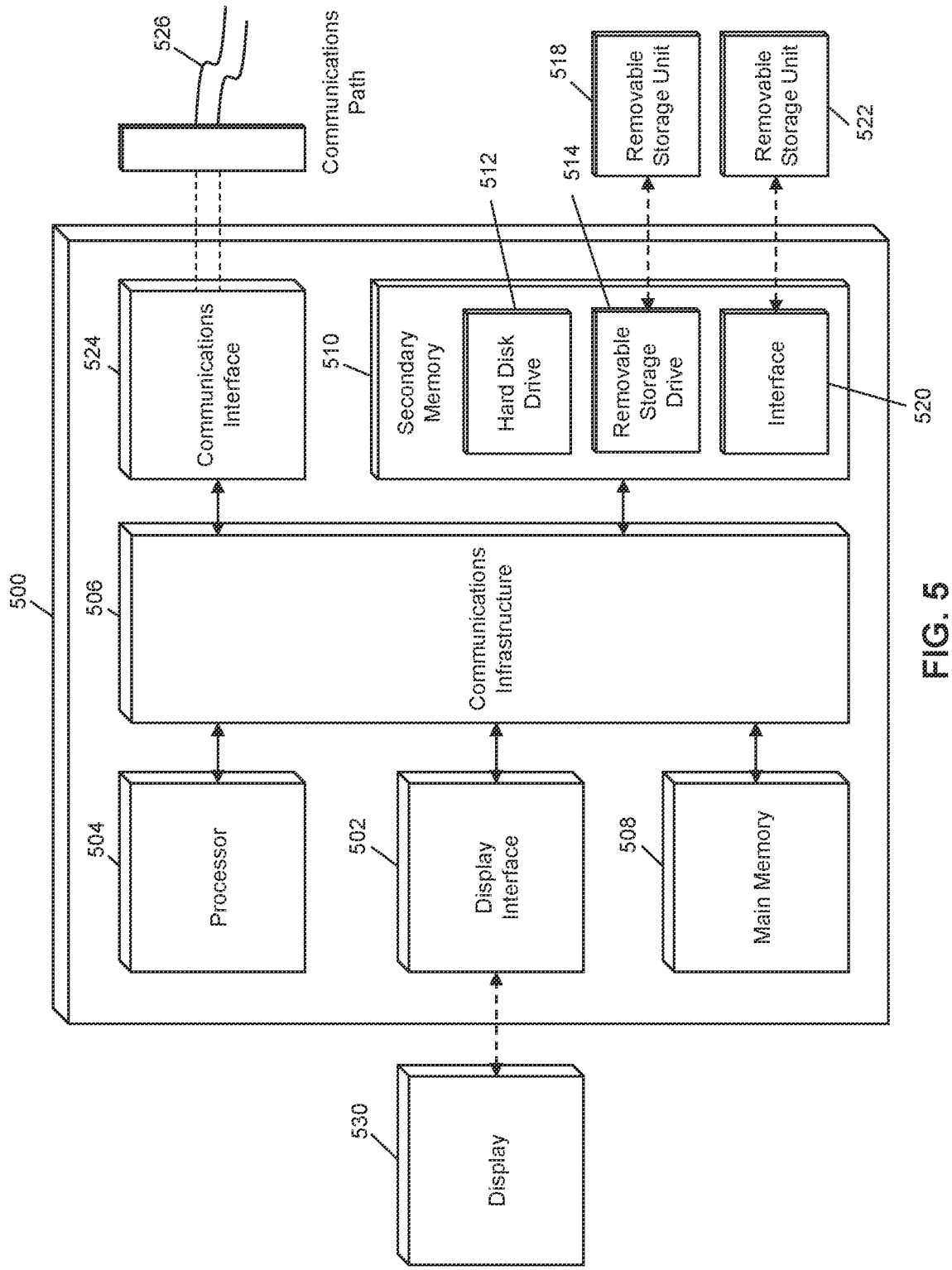
FIG. 5 is a block diagram illustrating a computer system architecture in accordance with exemplary embodiments.

The system 100 can include a user device 102. The user device 102 can be any type of computing device suitable for performing the functions discussed herein, such as those illustrated in FIG. 2 or 5 and discussed in more detail below, which can include a desktop computer, notebook computer, laptop computer, tablet computer, cellular phone, smart phone, smart watch, smart television, wearable computing device, implantable computing device, etc. The user device 102 may be possessed by or otherwise associated with a consumer. The user device 102, as used herein, can refer to the user device 102 itself or the associated consumer. The consumer can have a transaction account issued thereto by an issuing financial institution, where the issuing financial institution is represented in the system 100 by the issuer system 104, which can refer to the issuing financial institution itself or one or more computing systems thereof, which can by the same computing systems as illustrated in FIGS. 2 and 5 and discussed in more detail below.

In order to utilize the system 100, the consumer may request, using the user device 102, the issuer system 104 to issue a payment token thereto for a specific transaction account. The token can be requested using any suitable method or interface, such as via an application program or web page associated with the issuer system 104 available to the user device 102 as a customer of the issuing financial institution. The issuer system 104 can authenticate the user device 102, such as using the method discussed below or using traditional authentication processes, and can generate As referred to herein, "URN" is a unique value that can be generated by any suitable entity using any suitable format. In the above example, the issuer system 104 can generate the URN where the first portion, before the ":", can be a surrogate value of the transaction account number and the second portion, after the ":", can be an identification value associated with the issuer system 104, such as a bank identification number or other value that can be used for routing of a transaction message that includes the above payment credential. The value for "exp" can be an expiration date of the credential. The signature can be a digital signature generated for the credential, such as over a combination of the URN and expiration date, which can be generated using a private key of a cryptographic key pair of the issuer system 104, referred to herein as "issuer private key" and "issuer public key."

The issuer system 104 can generate the payment token and electronically transmit it to the user device 102. The user device 102 can then store the payment credential in a suitable memory thereof. After the user device 102 has receive the payment token, the user device 102 can be ready to participate in a payment transaction that is funded using the transaction account associated with the payment token.

In the system 100, each of the entities involved can have a credential associated therewith, which is also referred to herein as an identity or an identification value. The credential can be a digital value that is uniquely associated with the entity and/or device, similar to how the payment token is a credential for a transaction account. In an exemplary embodiment, an identity can include at least a URN for the entity. In some cases, an identity can further include or be accompanied by a public key of a cryptographic key pair associated with the entity. An identity can also be digitally signed by the entity using the private key of the entity's associated cryptographic key pair. In some cases, an identity can be digitally signed by a different entity, such as one that can vouch for the identity of the entity. For example, the issuer system 104 can digitally sign the identity of the user device 102 using its own issuer private key.

In an example, an identity can be the following format:

```
{
  "identity": {
    "urn": "7604209e-322e-11ec-8d3d-0242ac130003:c9eb1c08-322e-11ec-8d3d-0242ac130003",
    "publicKey": {
      "alg":"RSA",
      "mod":
"0vx7agoebGcQSuuPiLJXZptN9nndrQmbXEps2aiAFbWhM78LhWx
    4cbbfAAtVT86zwu1RK7aPFFxuhDR1L6tSoc__BJECPebWKRXjBZCiFV4n3oknj
hMs
    tn64tZ__2W-5JsGY4Hc5n9yBXArwl93lqt7__RN5w6Cf0h4QyQ5v-
65YGjQR0__FDW2
    QvzqY368QQMicAtaSqzs8KJZgnYb9c7d0zgdAZHzu6qMQvRL5hajrn1n91CbO
pbl
    SD08qNLyrdkt-bFTWhAl4vMQFh6WeZu0fM4lFd2NcRwr3XPksINHaQ-
G__xBnilqb
    w0Ls1jF44-csFCur-kEgU8awapJzKnqDKgw",
      "exp":"AQAB",
      "kid":"b4124684-3230-11ec-8d3d-0242ac130003"
    }
  },
  "signature":
"b58dd5603432aa0de72e2bf5d5c24b05761eb80b6de8eaf91e355567cf6aa7dc"
}
```

In the above example, "publicKey" is a representation of an RSA public key where the signature is generated using the corresponding RSA private key. In the system 100, a first entity can provide its identity to a second entity, where the second entity can validate the digital signature and compare the URN with an expected URN to verify 305 that the first entity is who it purports to be. For instance, the user device 102 can provide its identity to the issuer system 104 when requesting a payment token to ensure that the user device 102 is legitimate and authorized to receive a payment token for the specified token account. Similarly, the issuer system 104 can provide its identity to the user device 102 when providing the payment token or prior to receiving the request so the user device 102 can verify it is communicating with the proper issuer system 104 and not a fraudulent actor. In some embodiments, entity identities can be stored in a distributed ledger, such as a blockchain, as discussed in more detail below. If verification of an identity fails, the user device 102 or issuer system 104 can decline further participation in the processes discussed herein, as applicable.

In the system 100, when the user device 102 is interested in using its payment token for a payment transaction, the user device 102 can communicate with a merchant system 106 using a suitable communication network and method. The merchant system 106 can be a computing system, such as those illustrated in FIGS. 2 and 5 and discussed in more detail below, that is configured to perform the functions discussed herein on behalf of a merchant. As discussed herein, merchant system 106 can refer to the associated merchant or the system of the merchant itself.

The user device 102 and merchant system 106 can communicate and come to an agreement on terms of a payment transaction, such as an amount of the transaction. The user device 102 can generate a first data set for the payment transaction, referred to herein as TX1. The first data set can include at least the transaction data for the payment transaction, the payment credential, and a digital signature generated over the payload of the first data set (e.g., the transaction data and payment credential) using a private key of a cryptographic key pair of the user device 102, referred to herein as the user private key and user public key. In an example, TX1 can be of the following format:

```
{
  "payload": {
    "tx-id": "731cdaa8-3245-11ec-8d3d-0242ac130003",
    "amount": 100.00,
    "datetime": "20-12-2022T08:10:00",
    "tx-receiver-urn": "b3eb1c08-322e-11ec-8d3d-
0242ac130003:f957d064-323b-11ec-8d3d-0242ac130003",
    "credential": {
      "token": {
        "urn": "f603e19a-3232-11ec-8d3d-
0242ac130003:c9eb1c08-322e-11ec-8d3d-0242ac130003",
        "exp":"122022"
      },
      "signature":
"a48dd5603432aa0de72e2bf5d5c24b05761eb80b6de8eaf91e355567cf6aa34c"
    }
  },
  "signature":
"b58dd5603432aa0de72e2bf5d5c24b05761eb80b6de8eaf91e355567cf6aa7dc"
}
```

In the above example, the transaction data can include "tx-id," which is a unique identifier for the transaction, which can be generated by the merchant system 106 and communicated to the user device 102 using a suitable communication network and method. The "amount" value can refer to a transaction amount for the payment transaction that is to be paid from the user device's transaction account to a transaction account associated with the merchant. The value "datetime" can be a time and date when the transaction is taking place, which can be a timestamp for when TX1 is generated or a future time when the transaction is to be processed. The value "tx-receiver-urn" can be an URN for the recipient of the transaction, such as the merchant system 106. In some embodiments, the merchant system 106 can provide its URN and any other transaction data, such as the amount and transaction identifier, to the user device 102 via a quick response code or other machine-readable code that can be read by the user device 102 and the URN and other transaction data extracted therefrom.

In some embodiments, the merchant system 106 can provide its identity to the user device 102 along with its URN. In such an embodiment, the user device 102 can authenticate the merchant system 106 by verifying the provided identity before generating the first data set, such as to ensure that the payment is being made to the proper entity. If verification of the merchant system 106 fails, the user device 102 can decline further participation in the payment transaction. Once the first data set is generated and the user device 102 has authenticated the merchant system 106, if applicable, the user device 102 can electronically transmit the generated first data set to the merchant system 106 using a suitable communication network and method, such as via an application program or web page of the merchant system 106, using near field communication, Bluetooth, or other transmission protocol, via a quick response code, etc.

The merchant system 106 can receive the first data set and verify the data included therein, such as verifying that the transaction amount, transaction identifier, and merchant URN are correct. The merchant system 106 can also validate the digital signature over the payment credential using the issuer's public key (e.g., made available by the issuer system 104, such as a in a distributed ledger, discussed in more detail below) as well as validate the digital signature over the payload using the user device's public key. If the user device 102 provides its identity, the merchant system 106 can also validate the user's identity using the methods discussed herein. If any verification fails, the merchant system 106 can decline the payment transaction and stop the process. Once the first data set is successfully verified, the merchant system 106 can generate a second data set for the payment transaction, referred to herein as TX2. The second data set can include at least the first data set as well as an URN for the merchant's acquirer. In some cases, the second data set can also include a payment credential for the merchant, such as may be associated with a transaction account selected by the merchant system 106 to be used to receive the funds paid from the user device 102 for the payment transaction. In an example, TX2 can be of the following format:

```
{
    "payload" :{
        "datetime": "20-12-2022T08:10:00",
        "tx-id": "731cdaa8-3245-11ec-8d3d-0242ac130003",
        "accepted-mdr": "2.0%"
        "credential": {
            "token": {
                "urn": "3403e19a-3232-11ec-8d3d-
0242ac130003:c9eb1c08-322e-11ec-8d3d-0242ac130123",
                "exp":"122022"
            },
            "signature":
"db8dd5603432aa0de72e2bf5d5c24b05761eb80b6de8eaf91e355567cf6aa356"
        },
        "acquirer-urn": "c9eb1c08-322e-11ec-8d3d-
0242ac130123:1233e19a-3232-11ec-8d3d-0242ac110003",
        TX1
    },
    "signature":
"123dd5603432aa0de72e2bf5d5c24b05761eb80b6de8eaf91e355567cf6aa123"
}
```

In the above example, "TX1" refers to the above example of TX1, the entirety of which can be included in TX2, but is not illustrated above for readability. The "accepted-mdr" value can be a merchant discount rate, which can be applicable for the payment transaction as will be apparent to persons having ordinary skill in the art. In the example, the payload can be digitally signed using a private key of the merchant system's cryptographic key pair, referred to herein as a merchant private key and merchant public key.

Once the second data set has been generated and signed by the merchant system 106, the merchant system 106 can electronically transmit the second data set to an acquirer system 108. The acquirer system 108 can be a computing system, such as those illustrated in FIGS. 2 and 5 discussed in more detail below, associated with an acquiring financial institution that issues the transaction account to the merchant system 106 that was specified thereby in the second data set for receipt of the payment in the payment transaction being processed. As referred to herein, acquirer system 108 can refer to the computing system associated with the acquiring financial institution or the acquiring financial institution itself.

The acquirer system 108 can receive the second data set and can perform a verification of the second data set. The verification can include a verification of the payment credential provided by the merchant system 106 in the payload for the second data set, verification of the user device's payment credential included in the TX1 portion of the second data set, verification of one or more of the digital signatures in the second data set using the appropriate public keys, and, if applicable, verification of the merchant identity and/or user identity if included in the second data set. If a verification is unsuccessful, the acquirer system 108 can decline the payment transaction and return a message to the merchant system 106 accordingly, where the merchant system 106 can inform the consumer that the transaction was declined. If the verifications are successful, then the acquirer system 108 can generate a third data set for the payment transaction, also referred to herein as TX3. The third data set can include the second data set as well as the acquirer's URN (e.g., and identity, if applicable), as well as any additional transaction data and, in some cases, the URN for the next entity involved in the processing of the payment transaction, which, in the example illustrated in FIG. 1, can be a steward system 110. In an example, TX3 can be of the following format:

```
{
   "payload": {
      "datetime": "20-12-2022T08:10:00",
      "tx-id": "731cdaa8-3245-11ec-8d3d-0242ac130003"
      "urn": "c9eb1c08-322e-11ec-8d3d-0242ac130123:1233e19a-3232-11ec-8d3d-0242ac110003"
      "steward-urn": "abcccc08-322e-11ec-8d3d-0242ac130123:1233e19a-3232-11ec-8d3d-0242ac110101",
      "acquirer-interchange-fee": "20.0%",
      "steward-fee": "15.00%",
      "issuer-interchange-fee": "65%",
      TX2
   },
   "signature":
"123dd5603431234de72e2bf5d5c24b05761eb80b6de8eaf91e355567cf6aa555"
}
```

In the above example, "TX2" refers to the above example of TX2, the entirety of which can be included in TX3 but is not illustrated above for readability. The "urn" is the URN of the acquirer system 108, which matches the "acquirer-urn" from TX2. The "steward-urn" is the URN of the steward system 110 as the next recipient in the processing of the payment transaction. The "steward-fee" and "issuer-interchange-fee" values are fees for the processing of the payment transaction, which can be included or not included in a transaction, as applicable. The payload of TX3 can be digitally signed using a private key of a cryptographic key pair of the acquirer system 108, referred to herein as an acquirer private key and acquirer public key.

Once the third data set has been generated and signed by the acquirer system 108, the acquirer system 108 can electronically transmit the third data set to a steward system 110. A steward system 110 can be a computing system, such as those illustrated in FIGS. 2 and 5 and discussed in more detail below, that performs pre-authorization processing for payment transactions on behalf of other entities, such as the issuer system 104. In some embodiments, the steward system 110 can be a part of the issuer system 104 or acquirer system 108 where the issuer system 104 or acquirer system 108, respectively, performs the functions of the steward system 110 as discussed herein. In some cases, the steward system 110 can be a part of a payment network that is associated with payment rails used in the transmission of the data sets in the system 100.

The steward system 110 can receive the third data set from the acquirer system 108 and can verify the data included in the third data set. For instance, the steward system 110 can verify that the included "steward-urn" value matches its URN, can verify the values of the fees included in the payload for the third data set, can verify data included in the TX2 or TX1 portions of the third data set, as discussed above, as well as verifying the digital signature of the third data set using the acquirer public key. In cases where the acquirer system 108 includes its identity in the third data set, the steward system 110 can also verify the identity of the acquirer system 108. If any verification fails, the steward system 110 can decline the payment transaction and transmit a message accordingly to the acquirer system 108 to halt processing of the payment transaction.

If the verifications are successful, then the steward system 110 can generate a fourth data set for the payment transaction, referred to herein as TX4. The fourth data set can include the third data set as well as the steward system's URN. The fourth data set can also include an URN for the issuer system 104 as the next recipient of the data sets as part of the processing of the payment transaction. In an example, TX4 can be of the following format:

```
{
   "payload": {
      "datetime": "20-12-2022T08:10:00"
      "tx-id": "731cdaa8-3245-11ec-8d3d-0242ac130003",
      "urn": "abcccc08-322e-11ec-8d3d-0242ac130123:1233e19a-3232-11ec-8d3d-0242ac110101",
      "issuer-urn": "abcccc08-322e-11ec-8d3d-0242ac130123:1233e19a-3232-11ec-8d3d-0242ac110101",
      TX3
   },
   "signature":
"444dd5603431234de72e2bf5d5c24b05761eb80b6de8eaf91e355567cf6aa666"
}
```

In the above example, "TX3" refers to the above example of TX3, the entirety of which can be included in TX4 but is not illustrated above for readability. The "urn" is the URN of steward system 110, which matches the "steward-urn" from TX3. The "issuer-urn" is the URN of the issuer system 104 as the next recipient in the processing of the payment transaction. The payload of TX4 can be digitally signed using a private key of a cryptographic key pair of the steward system 110, referred to herein as a steward private key and steward public key.

Once the fourth data set has been generated, the steward system 110 can electronically transmit the signed fourth data set to the issuer system 104 using a suitable communication network and method. In cases where the steward system 110 can perform pre-authorization processes for multiple issuing financial institutions, the steward system 110 can identify the issuer system 104 using the payment credential included in TX1 in the fourth data set, where, in the above example, the second portion of the URN in the credential is uniquely associated with the issuer system 104.

The issuer system 104 can receive the fourth data set from the steward system 110 and verify the fourth data set and data included therein. Verification of the fourth data set can include verification that the "issuer-urn" in the fourth data set matches its own URN, verification of the payment credential included in TX1 and its signature, verification of the fees included in the data sets, and verification of any other signatures in the fourth data set using the appropriate public keys, including verification of the digital signature over the payload of the fourth data set using the steward public key. In cases where the steward system 110 includes its identity in the fourth data set, the issuer system 104 can also verify the identity of the steward system 110 using the process discussed above. If any of the verifications fail, then the issuer system 104 can decline the payment transaction and return a message to the steward system 110 accordingly for forwarding to the acquirer system 108 and eventually merchant system 106. In some instances, the issuer system 104 can electronically transmit a notification message to the user device 102 indicating the decline of the payment transaction, such as to notify the user device 102 in cases where a nefarious actor attempted use of a transaction account associated with the user device 102.

If the fourth data set is successfully verified, then the issuer system 104 can identify the transaction account associated with the payment token included in TX1 using the first portion of the URN in the token. Once the transaction account is identified, the issuer system 104 can determine if the payment transaction should be approved or declined using traditional methods, such as ensuring that a balance of the transaction account covers the amount for the payment transaction, that the transaction complies with any controls placed on the transaction account, etc. If the transaction is declined as a result of the processing, then the issuer system 104 can electronically transmit notifications to the steward system 110 and/or user device 102, as discussed above.

If the payment transaction is approved, the issuer system 104 can debit the user's transaction account accordingly and generate a fifth data set for the payment transaction, also referred to herein as TX5. The fifth data set can include the fourth data set as well as the issuer's URN, the URN of the steward system 110, and an indication of the result of the authorization process by the issuer system 104. In an example, TX5 can be of the following format:

```
{
    "payload": {
        "urn": "abcccc08-322e-11ec-8d3d-0242ac130123:1233e19a-3232-11ec-8d3d-0242ac110101",
        "datetime": "20-12-2022T08:10:00",
        "tx-id": "731cdaa8-3245-11ec-8d3d-0242ac130003",
        "steward-urn": "abcccc08-322e-11ec-8d3d-0242ac130123:1233e19a-3232-11ec-8d3d-0242ac110101",
        "authorization": "APPROVED",
        TX4
    },
    "signature": "564gh54654642298he78h2bf5d5c24b05761eb80b6de8eaa91e355567cf6cb886"
}
```

In the above example, "TX4" refers to the above example of TX4, the entirety of which can be included in TX5 but is not illustrated above for readability. The "urn" is the URN of issuer system 104, which matches the "issuer-urn" from TX4. The "steward-urn" is the URN of the steward system 110 as the next recipient in the processing of the payment transaction, which matches the URN of TX4 and the "steward-urn" from TX3. The payload of TX5 can be digitally signed using the issuer private key. The "authorization" value indicates the issuer system's result of the authorization process which, in this example, is an approval of the payment transaction. In some cases, the fifth data set does not need to include a signature over the payload by the issuer system 104.

Once the fifth data set has been generated and signed, the issuer system 104 can electronically transmit the signed fifth data set to the steward system 110 using a suitable communication network and method. The steward system 110 can verify the fifth data set, such as by verifying the included URNs, the authorization, and the other data and signatures included therein, as discussed above, including verification of the signature of the payload for the fifth data set using the issuer public key. Upon successful verification of the fifth data set, the steward system 110 can generate a sixth data set, also referred to herein as TX6. The sixth data set can include the fifth data set as well as the steward system's URN, the URN for the issuer system 104, the URN for the acquirer system 108, and an indication that the payment transaction has been completed. In an example, TX6 can be of the following format:

```
{
    "payload": {
        "urn": "abcccc08-322e-11ec-8d3d-0242ac130123:1233e19a-3232-11ec-8d3d-0242ac110101",
        "datetime": "20-12-2022T08:10:00",
        "tx-id": "731cdaa8-3245-11ec-8d3d-0242ac130003"
        "status": "COMPLETED",
```

```
    "issuer-urn": "abcccc08-322e-11ec-8d3d-
0242ac130123:1233e19a-3232-11ec-8d3d-0242ac110101",
        "acquirer-urn": "c9eb1c08-322e-11ec-8d3d-
0242ac130123:1233e19a-3232-11ec-8d3d-0242ac110003",
        TX5
    },
    "signature":
"345ec54654642298ad78h2bf5d5c24b05761eb80b6de8eaa91e355567cf6cb325"
}
```

In the above example, "TX5" refers to the above example of TX5, the entirety of which can be included in TX6 but is not illustrated above for readability. The "urn" is the URN of steward system 110. The "issuer-urn" is the URN of the issuer system 104, which matches the URN of TX5 and the "issuer-urn" from TX4. The "acquirer-urn" is the URN of the acquirer system 108, which matches the URN of TX3 and the "acquirer-urn" from TX2. The payload of TX6 can be digitally signed using the steward private key. The "status" value indicates the status of the payment transaction at this point of the process which, in this example, is complete. In some cases, the sixth data set does not need to include a signature over the payload by the steward system 110.

The steward system 110 can electronically transmit the sixth data set to the acquirer system 108. The acquirer system 108 can identify the status value in the sixth data set and transmit a notification to the merchant system 106 that the transaction was successfully processed. The acquirer system 108 can credit the transaction account used by the merchant to receive the funds of the payment transaction the amount included in the transaction data in TX1, and will receive settlement from the issuer system 104 using traditional methods. The merchant system 106 can finalize the payment transaction, such as by providing the transacted-for goods or services to the consumer. In some embodiments, the acquirer system 108 can verify one or more data values or signatures included in the sixth data set prior to notifying the merchant system 106 and crediting the associated transaction account.

The methods and systems discussed herein enable a payment transaction to be processed using a payment token in place of real account credentials where the real account credentials are known only to the issuer system 104 that issued the transaction account, which provides for significantly stronger security for consumers and issuing financial institutions without sacrificing convenience. It is noted that the solution described herein is not just limited to a four-party credit transaction but can also be applied to a person-to-person transaction for any two users, including their banks. The use of identities and signatures as part of the processing as discussed above provide for additional levels of security to ensure that each entity is trustworthy, and can be performed in a payment transaction conducted at a physical location or an entirely electronic (e.g., e-commerce) payment transaction.

In some embodiments, the data sets in the system 100 can be transmitted from one entity to another using payment rails associated with a payment network. Payment rails can refer to network infrastructure associated with a payment network that is specially configured for the transmission of transaction messages. A transaction message can be a specially formatted data message that is formatted according to one or more standards governing the exchange of financial transaction messages, such as the International Organization of Standardization's ISO 8583 or ISO 20022 standards. As referred to herein, a "payment network" can refer to a system or network used for the transfer of money via the use of cash-substitutes for thousands, millions, and even billions of transactions during a given period. Payment networks can use a variety of different protocols and procedures in order to process the transfer of money for various types of transactions. Transactions that can be performed via a payment network may include product or service purchases, credit purchases, debit transactions, fund transfers, account withdrawals, etc. Examples of networks or systems configured to perform as payment networks include those operated by Mastercard®, VISA®, Discover®, American Express®, PayPal®, etc. Use of the term "payment network" herein can refer to both the payment network as an entity, and the physical payment network, such as the equipment, hardware, and software comprising the payment network, also referred to herein as the payment rails.

In some embodiments where data sets are transmitted via payment rails, the data sets can be included in a transaction message. In some cases, the values in the payload of a data set can be stored in appropriate data elements of a transaction message, where the past data sets (e.g., TX1 in the second data set) can be stored in a data element reserved for private use. In some instances, a full data set can be stored in a data element reserved for private use, where the other data elements can include null values or other predetermined data to indicate to the entities in the system 100 that the payment transaction includes a digitized surrogate for processing using the methods discussed above.

In some embodiments, the acquirer, steward and issuing bank can be embodied as the same entities. In other embodiments, any two of the acquirer, steward and issuing bank can be embodied as the same entity.

In some embodiments, the system 100 can also include a blockchain network 112. The blockchain network 112 can be comprised of a plurality of blockchain nodes 114. Each blockchain node 114 can be a computing system, such as illustrated in FIG. 2 or 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values. Each block header can include at least a timestamp, a block reference value, and a data reference value. The timestamp can be a time at which the block header was generated, and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 114 in the blockchain network 112 prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 112 using the public key of the cryptographic key pair. In some cases, the term "blockchain wallet" can refer specifically to the private key. In other cases, the term "blockchain wallet" can refer to a computing device (e.g., user device 102, etc.) that stores the private key for use thereof in blockchain transactions. For instance, each computing device can each have their own private key for respective cryptographic key pairs, and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., a user device 102) that is generated using the sender's private key, a blockchain address of the recipient of currency (e.g., a merchant system 106) generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 114 in the blockchain network 112, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other nodes in the blockchain network 112 before being added to the blockchain and distributed to all of the blockchain nodes 114 in the blockchain network 112, respectively, in traditional blockchain implementations. In cases where a blockchain data value cannot be related to a blockchain transaction, but instead the storage of other types of data, blockchain data values can still include or otherwise involve the validation of a digital signature.

In the system 100, a blockchain or other distributed ledger can be used to store the data sets generated as part of the processing of the payment transaction discussed above. In an example, the acquirer system 108 can electronically transmit the third data set to a blockchain node 114 for inclusion in a blockchain data value that is included in a new block that is confirmed and added to the blockchain. The issuer system 104 can electronically transmit the fifth data set to a blockchain node 114 for addition to the blockchain, and the steward system 110 can electronically transmit the fourth and sixth data sets to a blockchain node 114 for addition to the blockchain. In such an example, several data sets for a payment transaction can be stored on a blockchain, which can be made publicly accessible. This can enable any entity involved in the payment transaction to verify a data set at its respective point in the transaction to ensure that the values and fees are correct and to validate the digital signatures. Because a payment token is used in place of real payment credentials, the data sets can be stored on a publicly accessible ledger without compromising the associated transaction account as only the authorized user device 102 could use the payment token in any future transactions due to having the proper private key.

In some embodiments, the system 100 can also include a distributed ledger, such as a blockchain, for storing identities of the entities in the system 100. In such embodiments, the blockchain can be the same blockchain used to store data sets as discussed above, or can be a separate blockchain that can also be associated with and operated via the blockchain network 112 or can be associated with and operated via a separate and distinct blockchain network 112. In such embodiments, blockchain data values stored in the blockchain can include an identity of an entity, such as discussed above, which can include a URN, public key, and signature generated using the private key of the cryptographic key pair that includes the public key. In some cases, an identity of an entity may be signed by a separate entity, such as the identity of the user device 102 being signed by the issuer system 104. In such cases, the identity of the issuer system 104 stored in the blockchain can include the same signature as the same issuer public key would be included in both identities, where each identity would include a different URN corresponding to the associated entity.

In embodiments where a distributed ledger is used to store identities, each entity in the system 100 can use the distributed ledger when verifying the identity of another entity as part of the processes discussed above. In an example, the merchant system 104 can provide its URN and a transaction amount to the user device 102 when proposing the payment transaction along with the merchant system's identity. The user device 102 can access the distributed ledger that stores identities to identify a blockchain data value that stores an identity associated with the merchant system 104 to match the stored identity with the identity provided by the merchant system 104. In another example, the merchant system 104 can provide a digital signature of its URN and transaction amount to the user device 102 generated using its merchant private key. The user device 102 can access the merchant system's identity on the distributed ledger and identify the merchant public key therefrom, and use the merchant public key to validate the digital signature of the URN and transaction amount, where the digital signature will only successfully validate using the merchant public key if the merchant system 104 used the corresponding merchant private key, thus authenticating the merchant system 104 as genuine. In such an example, each entity in the system 100 can verify the identity of any other entity in the system 100 using the distributed ledger. In cases where identities are included in data sets stored on a blockchain, each entity can verify the identity of every other entity at any point in the payment transaction by extracting the identity from the data set and verifying it as discussed above.

In some cases, one or more entities can perform identity verification on behalf of another entity in the system 100. For instance, the issuer system 104 can be configured to perform identity verification for the user device 102, where the user device 102 can forward the digital signature and/or identity from the merchant system 106 to the issuer system 104. The issuer system 104 can validate the merchant system's identity and provide a result of the validation to the user device 102, which can then use the validation as part of the verification of the data provided by the merchant system 104 prior to the generation of the first data set.

The use of a distributed ledger to store identities of entities involved in the system 100 can provide yet another level of security to ensure that each participant in a payment transaction is genuine and to significantly reduce the likelihood of fraud for any payment transaction due to the decentralized and immutable nature of distributed ledgers.

In some embodiments, communications electronically transmitted between entities in the system 100 can be encrypted. In such embodiments, an entity can encrypt data (e.g., a generated data set) prior to transmission, where the receiving entity can decrypt the data upon receipt prior to verification. In cases where a data set is digitally signed by the transmitting entity, the digital signature can be generated on the decrypted payload or, in some instances, can be generated over the encrypted payload where the data set can include an encrypted payload and the digital signature. In an example, the acquirer system 106 can be configured to encrypt communications made to the steward system 110 including the third data set. The acquirer system 106 can generate a random ephemeral symmetric key, referred to herein as a session key. The acquirer system 106 uses the session key to encrypt the payload of the third data set, and then the acquirer system 106 can encrypt the session key using the steward public key (e.g., retrieved from the steward system's identity on the distributed ledger). The acquirer system 106 can digitally sign the encrypted payload and the encrypted session key with the acquirer private key, and transmit the entire package to the steward system 110 as the third data set. The steward system 110 can validate the digital signature using the acquirer public key (e.g., retrieved from the acquirer system's identity on the distributed ledger), use the steward private key to decrypt the session key, and then decrypt the encrypted payload using the decrypted session key. In such embodiments, the use of encryption can provide even greater security with minimal addition of functions due to the use of existing keys and identity information available using the methods discussed above.

Computing System

FIG. 2 illustrates an embodiment of a computing system 200. It will be apparent to persons having skill in the relevant art that the embodiment of the computing system 200 illustrated in FIG. 2 is provided as illustration only and cannot be exhaustive to all possible configurations of the computing system 200 suitable for performing the functions as discussed herein. For example, the computer system 500 illustrated in FIG. 5 and discussed in more detail below can be a suitable configuration of the computing system 200. In some cases, additional components of the system 100, such as the user device 102, issuer system 104, merchant system 106, acquirer system 108, steward system 110, and blockchain nodes 114 can include the components illustrated in FIG. 2 and discussed below.

The computing system 200 can include a receiving device 202. The receiving device 202 can be configured to receive data over one or more networks via one or more network protocols. In some instances, the receiving device 202 can be configured to receive data from user devices 102, issuer systems 104, merchant systems 106, acquirer systems 108, steward systems 110, blockchain nodes 114, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by user devices 102, issuer systems 104, merchant systems 106, acquirer systems 108, steward systems 110, and/or blockchain nodes 114 that can be superimposed or otherwise encoded with identities, digital signatures, URNs, data sets, transaction data, transaction messages, notification messages, blockchain data values, blockchain data, public keys, transaction identifiers, timestamps, etc.

The computing system 200 can also include a communication module 204. The communication module 204 can be configured to transmit data between modules, engines, databases, memories, and other components of the computing system 200 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the computing system 200 and external components of the computing system 200, such as externally connected databases, display devices, input devices, etc. The computing system 200 can also include a processing device. The processing device can be configured to perform the functions of the computing system 200 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, verification module 220, encryption module 222, etc. As used herein, the term "module" can be software or hardware particularly programmed to receive an input, perform one or more processes using the input, and provides an output. The input, output, and processes performed by various modules will be apparent to one skilled in the art based upon the present disclosure.

The computing system 200 can also an account database 206. The account database 206 can be configured to store one or more account profiles 208 using a suitable data storage format and schema. The account database 206 can be a relational database that utilizes structured query language for the storage, identification, modifying, updating, accessing, etc. of structured data sets stored therein. Each account profile 208 can be a structured data set configured to store data related to an account for an entity. For example, an issuer system 104 or acquirer system 108 can store account profiles 208 related to transaction accounts, which can include account numbers, payment tokens, balances, transaction histories, etc. In another example, a merchant system 106 can store account profiles 208 related to accounts of consumers that transact with the related merchant including one for the user device 102 in the system 100, which can include an identity for the consumer, a user public key, a loyalty or reward number, transaction history, etc.

The computing system 200 can also include blockchain data 210, which can be stored in a memory 214 of the processing server 102 or stored in a separate area within the computing system 200 or accessible thereby. The blockchain data 210 can include a blockchain, which may be comprised of a plurality of blocks and be associated with the blockchain network 112. In some cases, the blockchain data 210 can further include any other data associated with the blockchain and management and performance thereof, such as block generation algorithms, digital signature generation and confirmation algorithms, communication data for blockchain nodes 114, smart contracts, etc. The blockchain data 210 can also include data used by the computing system 200 for actions associated with a blockchain, such as cryptographic key pairs for blockchain wallets, public keys for generating destination addresses or validating digital signatures, etc.

The computing system 200 can also include a memory 214. The memory 214 can be configured to store data for use by the computing system 200 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the computing system 200 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, cryptographic algorithms, encryption algorithms, communication information, data formatting rules, transaction message formatting rules, network identifiers, fee data, etc.

The computing system 200 can include a querying module 216. The querying module 216 can be configured to execute queries on databases to identify information. The querying module 216 can receive one or more data values or query strings, and can execute a query string based thereon on an indicated database, such as the entity database 206 of the computing system 200 to identify information stored therein. The querying module 216 can then output the identified information to an appropriate engine or module of the computing system 200 as necessary. The querying module 216 can, for example, execute a query on the memory 214 to identify URNs and associated public keys for verifying received data sets or generating new data sets.

The computing system 200 can also include a generation module 218. The generation module 218 can be configured to generate data for use by the computing system 200 in performing the functions discussed herein. The generation module 218 can receive instructions as input, can generate data based on the instructions, and can output the generated data to one or more modules of the computing system 200. For example, the generation module 218 can be configured to generate data sets, generate digital signatures, generate transaction messages, generate notification messages, generated transaction identifiers, generate new cryptographic keys, generate session keys, etc.

The computing system 200 can also include a verification module 220. The verification module 220 can be configured to perform verifications for the computing system 200 as part of the functions discussed herein. The verification module 220 can receive instructions as input, which can also include data to be used in performing a verification, can perform a verification as requested, and can output a result of the verification to another module or engine of the computing system 200. The verification module 220 can, for example, be configured to verify digital signatures using suitable signature generation algorithms and keys, verify hash values by hashing supplied data using a suitable one-way hashing algorithm, verify fee amounts, verify entity identities using public keys and blockchain data, verify transaction data in a data set, etc.

The computing system 200 can also include an encryption module 222. The encryption module 222 can be configured to perform encryptions and decryptions for the computing system 200 as part of the functions discussed herein. The encryption module 222 can receive instructions as input, which can also include data to be encrypted or encrypted data to be decrypted, can perform the encryption or decryption as requested, and can output the result of the encryption or decryption operation to another module or engine of the computing system 200. The encryption module 222 can, for example, be configured to encrypt a generated data set prior to transmission or decrypt a received encrypted data set.

The computing system 200 can also include a transmitting device 224. The transmitting device 224 can be configured to transmit data over one or more networks via one or more network protocols. In some instances, the transmitting device 224 can be configured to transmit data to user devices 102, issuer systems 104, merchant systems 106, acquirer systems 108, steward systems 110, blockchain nodes 114, and other entities via one or more communication methods, local area networks, wireless area networks, cellular communication, Bluetooth, radio frequency, the Internet, etc. In some embodiments, the transmitting device 224 can be comprised of multiple devices, such as different transmitting devices for transmitting data over different networks, such as a first transmitting device for transmitting data over a local area network and a second transmitting device for transmitting data via the Internet. The transmitting device 224 can electronically transmit data signals that have data superimposed that can be parsed by a receiving computing device. In some instances, the transmitting device 224 can include one or more modules for superimposing, encoding, or otherwise formatting data into data signals suitable for transmission.

The transmitting device 224 can be configured to electronically transmit data signals to user devices 102, issuer systems 104, merchant systems 106, acquirer systems 108, steward systems 110, and/or blockchain nodes 114 that can be superimposed or otherwise encoded with identities, digital signatures, URNs, data sets, transaction data, transaction messages, notification messages, blockchain data values, blockchain data, public keys, transaction identifiers, timestamps, etc.

Payment Processing Using Distributed Digitized Surrogates

Figure 3:
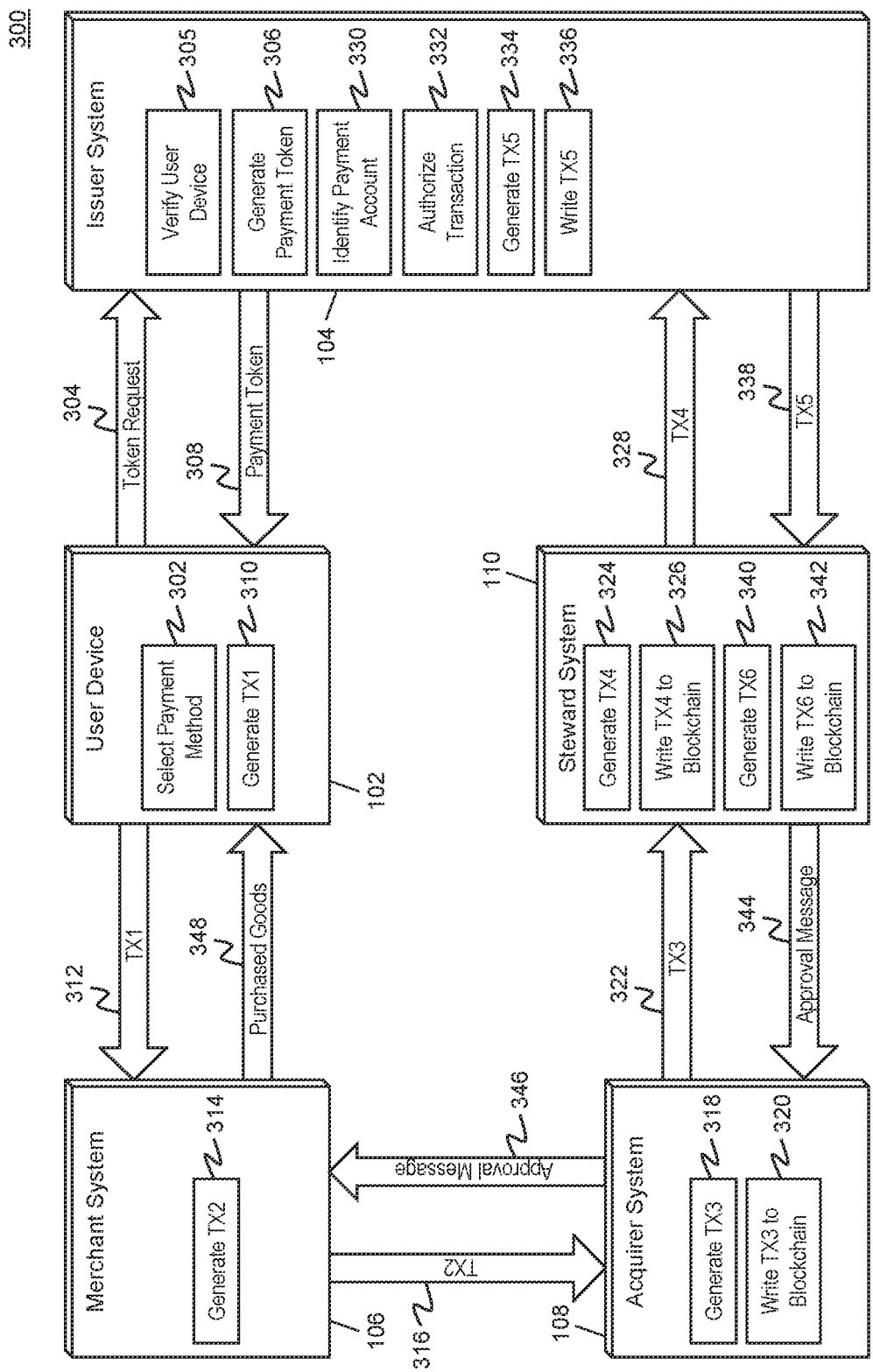
FIG. 3 is a flow diagram illustrating a process for payment processing using distributed digitized surrogates in the system of FIG. 1 in accordance with exemplary embodiments.

FIG. 3 illustrates a process 300 for the processing of a payment transaction in the system 100 that utilizes a payment token in place of real payment credentials with transaction data sets stored in a distributed ledger.

In step 302, the user of the user device 102, using an input module thereof, can select a payment method to be used for an upcoming payment transaction. In step 304, the user device 102 can electronically transmit (e.g., via a transmitting device 224) a token request to the issuer system 104 using a suitable communication network and method, such as via an application program executed by the user device 102 that is associated with the issuer system 104. The token request can include at least an identifier associated with the transaction account selected by the user of the user device 102. In some cases, the token request can be digitally signed by the user device 102 using the user private key. The issuer system 104 can receive (e.g., via a receiving device 202) the token request and, if signed, validate (e.g., via a verification module 220) the digital signature using the user public key (e.g., received in a previous onboarding process, obtained from the identity distributed ledger, etc.).

Once validated, the issuer system 104 can identify (e.g., via a querying module 216) an account profile (e.g., account profile 208) associated with the transaction account that was selected by the user device 102 and indicated in the token request and generate (e.g., via a generation module 218) a new payment token for the transaction account, where the payment token includes at least a URN that includes an identifier associated with the issuer system 104. The issuer system 104 can digitally sign (e.g., via a generation module 218) the payment token using the issuer private key and, in step 308, electronically transmit (e.g., via a transmitting device 224) the signed payment token to the user device 102 for receipt thereby (e.g., via a receiving device 202). In some embodiments, the user device 102 can validate (e.g., via a verification module 220) the digital signature of the payment token upon receipt.

In step 310, the user device 102 can generate (e.g., via a generation module 218) TX1 as a first data set for a new payment transaction. TX1 can include at least a payload comprising the signed payment token, a timestamp, a transaction identifier, a transaction amount, and a URN for the merchant system 106 ("merchant URN"), and a digital signature over the payload generated (e.g., via a generation module 218) by the user device 102 using the user private key. The transaction identifier, transaction amount, and merchant URN can be input to the user device 102 by the user thereof, received from the merchant system 106, or obtained using other suitable method. In step 312, the user device 102 can transmit (e.g., via a transmitting device 224) TX1 to the merchant system 106 using a suitable communication network and method. The merchant system 106 can receive (e.g., via a receiving device 202) TX1 and verify (e.g., via a verification module 220) the transaction identifier, transaction amount, and merchant URN as being equal to expected values and validate the digital signature over the payload using the user public key (e.g., obtained from the identity distributed ledger, an account profile of the consumer, etc.).

In step 314, the merchant system 106 can generate (e.g., via a generation module 218) TX2 as a second data set for the payment transaction. TX2 can include at least a payload comprising the timestamp, transaction identifier, a signed payment credential for the merchant's transaction account with the acquirer system 108, an URN for the acquirer system 108 ("acquirer URN"), fee data, and TX1, and a digital signature over the payload generated (e.g., via a generation module 218) by the merchant system 106 using the merchant private key. In step 316, the merchant system 106 can transmit (e.g., via a transmitting device 224) TX2 to the acquirer system 108 using a suitable communication network and method. The acquirer system 108 can receive (e.g., via a receiving device 202) TX2 and verify (e.g., via a verification module 220) the transaction identifier, acquirer URN, and fee data as being equal to expected values, validate the digital signature over the merchant's payment credential using the acquirer public key, and validate the digital signature over the payload using the merchant public key (e.g., obtained from the identity distributed ledger, an account profile of the merchant system 106, etc.).

In step 318, the acquirer system 108 can generate (e.g., via a generation module 218) TX3 as a third data set for the payment transaction. TX3 can include at least a payload comprising the timestamp, transaction identifier, the acquirer URN, an URN for the steward system 110 ("steward URN"), fee data, and TX2, and a digital signature over the payload generated (e.g., via a generation module 218) by the acquirer system 108 using the acquirer private key. In step 320, the acquirer system 108 can electronically transmit (e.g., via a transmitting device 224) the generated TX3 to a blockchain node 114 in the blockchain network 112 for writing thereof to the blockchain in a blockchain data value included in a new block that is confirmed and added to the blockchain. In step 322, the acquirer system 108 can transmit (e.g., via a transmitting device 224) TX3 to the steward system 110 using a suitable communication network and method. The steward system 110 can receive (e.g., via a receiving device 202) TX3 and verify (e.g., via a verification module 220) the transaction identifier, steward URN, and fee data as being equal to expected values and validate the digital signature over the payload using the acquirer public key (e.g., obtained from the identity distributed ledger, an account profile of the acquirer system 108, etc.).

In step 324, the steward system 110 can generate (e.g., via a generation module 218) TX4 as a fourth data set for the payment transaction. TX4 can include at least a payload comprising the timestamp, transaction identifier, the steward URN, an URN for the issuer system 104 ("issuer URN"), and TX3, and a digital signature over the payload generated (e.g., via a generation module 218) by the steward system 110 using the steward private key. In step 326, the steward system 110 can electronically transmit (e.g., via a transmitting device 224) the generated TX4 to a blockchain node 114 in the blockchain network 112 for writing thereof to the blockchain in a blockchain data value included in a new block that is confirmed and added to the blockchain. In step 328, the steward system 110 can transmit (e.g., via a transmitting device 224) TX4 to the issuer system 104 using a suitable communication network and method. The issuer system 104 can receive (e.g., via a receiving device 202) TX4 and verify (e.g., via a verification module 220) the transaction identifier, issuer URN, and fee data as being equal to expected values, validate the digital signature over the user's payment token in TX1 using the issuer public key, and validate the digital signature over the payload using the steward public key (e.g., obtained from the identity distributed ledger, an account profile of the steward system 110, etc.).

In step 330, the issuer system 104 can identify (e.g., in an account database 206) the transaction account (e.g., via an account profile 208) to be used to fund the payment transaction, if approved, based on the URN included in the payment credential included in the TX1 portion of the payload of TX4. In step 332, the issuer system 104 can determine that the payment transaction is to be approved, such as based on the transaction amount included in the payload of TX1 being less than an available balance or available credit for the identified transaction account and other transaction data being in compliance with any applicable transaction controls.

In step 334, the issuer system 104 can generate (e.g., via a generation module 218) TX5 as a fifth data set for the payment transaction. TX5 can include at least a payload comprising the timestamp, transaction identifier, the issuer URN, the steward URN, an authorization for the payment transaction, and TX4, and a digital signature over the payload generated (e.g., via a generation module 218) by the issuer system 104 using the issuer private key. In step 336, the issuer system 104 can electronically transmit (e.g., via a transmitting device 224) the generated TX5 to a blockchain node 114 in the blockchain network 112 for writing thereof to the blockchain in a blockchain data value included in a new block that is confirmed and added to the blockchain. In step 338, the issuer system 104 can transmit (e.g., via a transmitting device 224) TX4 to the steward system 110 using a suitable communication network and method. The steward system 110 can receive (e.g., via a receiving device 202) TX4 and verify (e.g., via a verification module 220) the transaction identifier, steward URN, and authorization as being equal to expected values and validate the digital signature over the payload using the issuer public key (e.g., obtained from the identity distributed ledger, an account profile of the issuer system 104, etc.).

In step 340, the steward system 110 can generate (e.g., via a generation module 218) TX6 as a sixth data set for the payment transaction. TX6 can include at least a payload comprising the timestamp, transaction identifier, the issuer URN, the steward URN, the acquirer URN, a status for the payment transaction, and TX5, and a digital signature over the payload generated (e.g., via a generation module 218) by the steward system 110 using the steward private key. In step 342, the steward system 110 can electronically transmit (e.g., via a transmitting device 224) the generated TX6 to a blockchain node 114 in the blockchain network 112 for writing thereof to the blockchain in a blockchain data value included in a new block that is confirmed and added to the blockchain. In step 344, the steward system 110 can electronically transmit an approval message to the acquirer system 108 via a suitable communication network and method. The approval message can include the at least transaction identifier and an indication that the payment transaction was approved and successfully processed. The acquirer system 108 can receive (e.g., via a receiving device 202) the approval message and, in step 346, forward (e.g., via a transmitting device 224) the approval message to the merchant system 106 using a suitable communication network and method. The merchant system 106 can receive (e.g., via a receiving device 202) the approval message and, in step 348, provide the goods purchased using the payment transaction to the consumer.

Exemplary Method for Pre-Authorization of a Payment Transaction

Figure 4:
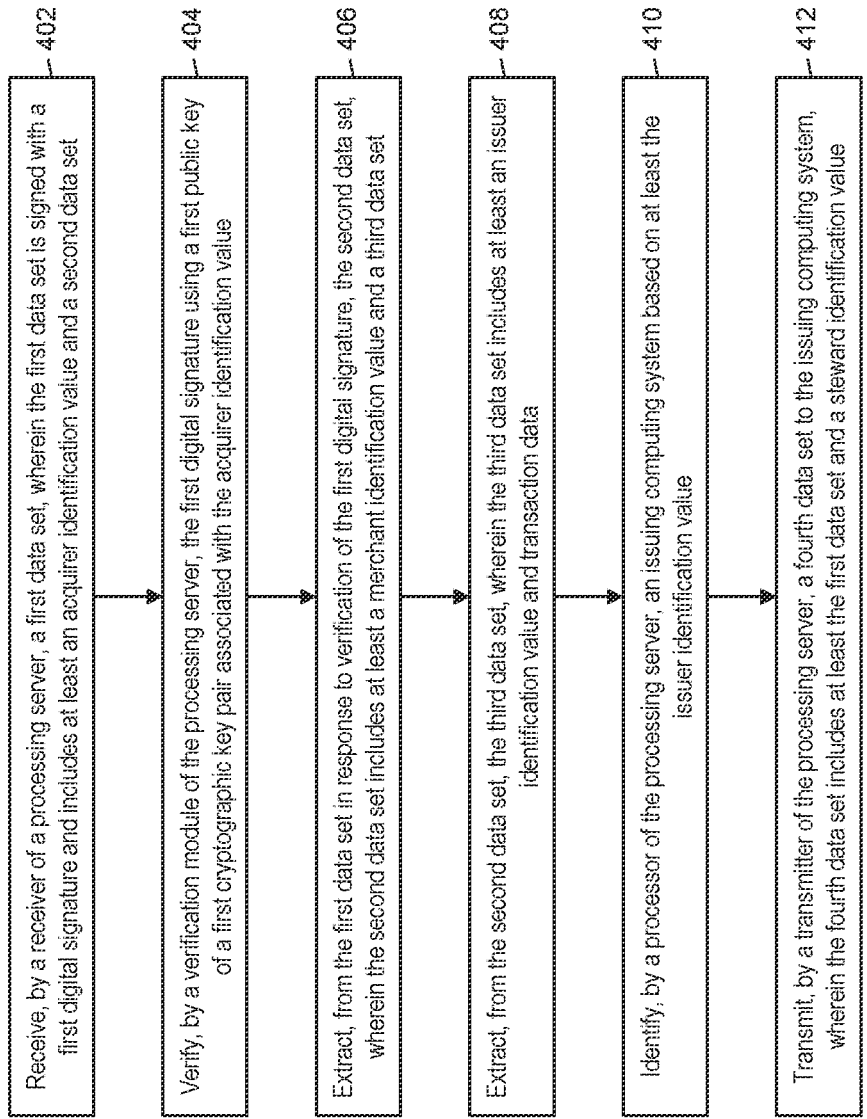
FIG. 4 is a flow chart illustrating an exemplary method for pre-authorization of a payment transaction with tokenized credentials in accordance with exemplary embodiments.

FIG. 4 illustrates a method 400 for the pre-authorization of a payment transaction that uses tokenized payment credentials.

In step 402, a first data set can be received by a receiver (e.g., receiving device 202) of a processing server (e.g., steward system 110), wherein the first data set (e.g., TX3) is signed with a first digital signature and includes at least an acquirer identification value (e.g., acquirer URN) and a second data set (e.g., TX2). In step 404, the first digital signature can be verified by a verification module (e.g., verification module 220) of the processing server using a first public key of a first cryptographic key pair associated with the acquirer identification value. In step 406, the second data set can be extracted from the first data set in response to verification of the first digital signature, wherein the second data set includes at least a merchant identification value (e.g., merchant URN) and a third data set (e.g., TX1).

In step 408, the third data set can be extracted from the second data set, wherein the third data set includes at least an issuer identification value (e.g., issuer URN, second portion of an URN in a payment credential, etc.) and transaction data. In step 410, an issuing computing system (e.g., issuer system 104) can be identified by a processor (e.g., querying module 216) of the processing server based on at least the issuer identification value. In step 412, a fourth data set (e.g., TX4) can be transmitted by a transmitter (e.g., transmitting device 224) of the processing server to the issuing computing system, wherein the fourth data set includes at least the first data set and a steward identification value (e.g., steward URN).

In one embodiment, the method 400 can further include verifying, by the verification module of the processing server, that an acquirer value corresponds to the acquirer identification value prior to extracting the third data set, wherein the second data set further includes the acquirer value, and the third data set is extracted in response to verification that the acquirer value corresponds to the acquirer identification value. In some embodiments, the first data set can be encrypted using a second public key of a second cryptographic key pair, and the method 400 can further comprises decrypting, by an encryption module (e.g., encryption module 222) of the processing server, the first data set using a private key of the second cryptographic key pair. In one embodiment, the method 400 can also include encrypting, by an encryption module of the processing server, the fourth data set prior to transmission to the issuing computing system using the issuer public key.

In some embodiments, the acquirer identification value, merchant identification value, issuer identification value, and steward identification value can each include at least an identifier and an associated public key. In a further embodiment, the acquirer identification value, merchant identification value, issuer identification value, and steward identification value can each be digitally signed using a private key of an identity cryptographic key pair that includes the respective associated public key. In one embodiment, the transaction data can include tokenized payment account data. In a further embodiment, the tokenized payment account data can be digitally signed by the issuing computing system.

Computer System Architecture

FIG. 5 illustrates a computer system 500 in which embodiments of the present disclosure, or portions thereof, can be implemented as computer-readable code. For example, user device 102, issuer system 104, merchant system 106, acquirer system 108, steward system 110, and blockchain node 114 of FIG. 1 and the computing system 200 of FIG. 2 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3 and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3 and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods pre-authorization of a payment transaction with tokenized credentials. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for pre-authorization of a payment transaction with tokenized credentials, comprising:
    receiving, by a receiver of a processing server, from an acquirer system, a first data set that is comprised of at least a second data set (1) that is appended with an acquirer identification value associated with the acquirer system, and (2) that the acquirer system received from a merchant system, wherein the first data set is signed with a first digital signature of the acquirer system;
    performing, by the processing server, pre-authorization of the payment transaction by
        verifying, by a verification module of the processing server, the first digital signature of the acquirer system using a first public key of a first cryptographic key pair associated with the acquirer identification value;
        after verifying the first digital signature of the acquirer system, extracting the second data set from the first data set, wherein the second data set is comprised of at least a third data set (1) that is appended with a merchant identification value associated with the merchant system, and (2) that the merchant system received from a user device;
        extracting, from the extracted second data set, the third data set including at least transaction data for the payment transaction and a unique value generated by an issuer system to include two distinct portions separated by a marker where a first portion of the two distinct portions of the unique value includes a digitized surrogate value of a transaction account number and a second portion includes an issuer identification value associated with the issuer system; and
        identifying, by a processor of the processing server, an issuing computing system based on at least the issuer identification value included in the second portion of the unique value; and
    transmitting, by a transmitter of the processing server, a fourth data set to the identified issuing computing system, wherein the fourth data set includes at least the first data set and a steward identification value associated with the processing server.

2. The method of claim 1, further comprising:
    verifying, by the verification module of the processing server, that an acquirer value corresponds to the acquirer identification value prior to extracting the third data set, wherein
    the second data set further includes the acquirer value, and
    the third data set is extracted in response to verification that the acquirer value corresponds to the acquirer identification value.

3. The method of claim 1, wherein
    the first data set is encrypted using a second public key of a second cryptographic key pair, and
    the method further comprises:
    decrypting, by an encryption module of the processing server, the first data set using a private key of the second cryptographic key pair.

4. The method of claim 1, further comprising:
encrypting, by an encryption module of the processing server, the fourth data set prior to transmission to the issuing computing system using a public key of the issuing computing system.

5. The method of claim 1, wherein the acquirer identification value, merchant identification value, issuer identification value, and steward identification value each include at least an identifier and an associated public key.

6. The method of claim 5, wherein the acquirer identification value, merchant identification value, issuer identification value, and steward identification value are each digitally signed using a private key of an identity cryptographic key pair that includes the respective associated public key.

7. The method of claim 1, wherein the transaction data includes tokenized payment account data.

8. The method of claim 7, wherein the tokenized payment account data is digitally signed by the issuing computing system.

9. A system for pre-authorization of a payment transaction with tokenized credentials, comprising:
at least one issuing computing system;
a user device;
a merchant system;
an acquirer system; and
a processing server,
wherein the processing server includes a processor and a memory, the memory having instructions stored therein that when executed cause the processor to:
receive, from the acquirer system, a first data set that is comprised of at least a second data set (1) that is appended with an acquirer identification value associated with the acquirer system, and (2) that the acquirer system received from the merchant system, wherein the first data set is signed with a first digital signature of the acquirer system;
perform pre-authorization of the payment transaction by
verifying the first digital signature of the acquirer system using a first public key of a first cryptographic key pair associated with the acquirer identification value,
extracting, after verifying the first digital signature, the second data set from the first data set, wherein the second data set is comprised of at least a third data set (1) that is appended with a merchant identification value associated with the merchant system, and (2) that the merchant system received from the user device,
extracting, from the second data set, the third data set including at least transaction data for the payment transaction and a unique value generated by an issuer system to include two distinct portions separated by a marker where a first portion of the two distinct portions of the unique value includes a digitized surrogate value of a transaction account number and a second portion includes an issuer identification value associated with an issuing computing system of the at least one issuing computer system, and
identifying the issuing computing system based on at least the issuer identification value included in the second portion of the unique value; and
transmit a fourth data set to the identified issuing computing system, wherein the fourth data set includes at least the first data set and a steward identification value associated with the processing server.

10. The system of claim 9, wherein
the processing server verifies that an acquirer value corresponds to the acquirer identification value prior to extracting the third data set,
the second data set further includes the acquirer value, and
the third data set is extracted in response to verification that the acquirer value corresponds to the acquirer identification value.

11. The system of claim 9, wherein
the first data set is encrypted using a second public key of a second cryptographic key pair, and
the processing server further decrypts the first data set using a private key of the second cryptographic key pair.

12. The system of claim 9, wherein the processing server further encrypts the fourth data set prior to transmission to the issuing computing system using a public key of the issuing computing system.

13. The system of claim 9, wherein the acquirer identification value, merchant identification value, issuer identification value, and steward identification value each include at least an identifier and an associated public key.

14. The system of claim 13, wherein the acquirer identification value, merchant identification value, issuer identification value, and steward identification value are each digitally signed using a private key of an identity cryptographic key pair that includes the respective associated public key.

15. The system of claim 9, wherein the transaction data includes tokenized payment account data.

16. The system of claim 15, wherein the tokenized payment account data is digitally signed by the issuing computing system.

* * * * *